United States Patent
Schaefer et al.

(10) Patent No.: US 7,263,877 B2
(45) Date of Patent: Sep. 4, 2007

(54) DETERMINATION OF THE PISTON STROKE IN A RECIPROCATING PISTON MACHINE

(75) Inventors: Tilo Schaefer, Daubach (DE); Georg Weber, Egelsbach (DE)

(73) Assignee: Luk Fahrzeug-Hydraulik GmbH & Co. KG, Bad Homburg v.d.H (DE)

(*) Notice: Subject to any disclaimer, the term of this patent is extended or adjusted under 35 U.S.C. 154(b) by 0 days.

(21) Appl. No.: 10/495,824

(22) PCT Filed: Nov. 15, 2002

(86) PCT No.: PCT/DE02/04232

§ 371 (c)(1),
(2), (4) Date: Sep. 28, 2004

(87) PCT Pub. No.: WO03/046382

PCT Pub. Date: Jun. 5, 2003

(65) Prior Publication Data

US 2005/0028615 A1    Feb. 10, 2005

(30) Foreign Application Priority Data

Nov. 19, 2001   (DE) ................. 101 56 784

(51) Int. Cl.
*G01M 15/00*   (2006.01)
(52) U.S. Cl. ...................................... 73/116
(58) Field of Classification Search .............. 73/112, 73/115, 116, 117.2, 117.3, 118.1, 119 R
See application file for complete search history.

(56) References Cited

U.S. PATENT DOCUMENTS

| | | | |
|---|---|---|---|
| 4,966,529 A * | 10/1990 | Ide ........................... 417/218 |
| 5,996,422 A | 12/1999 | Buck et al. ............. 78/863.03 |
| 6,289,680 B1 | 9/2001 | Oh et al. ..................... 62/6 |
| 6,381,545 B1 * | 4/2002 | Goubeaux et al. ........... 702/35 |
| 6,519,960 B2 * | 2/2003 | Suitou et al. .............. 62/228.3 |
| 6,520,746 B2 * | 2/2003 | Yoo et al. ................ 417/44.11 |
| 2003/0019227 A1 * | 1/2003 | Yokomachi et al. ....... 62/228.3 |

* cited by examiner

*Primary Examiner*—Eric S. McCall
(74) *Attorney, Agent, or Firm*—Davidson, Davidson & Kappel, LLC

(57) ABSTRACT

A method for determining the piston stroke of a reciprocating piston machine having a variable stroke, for example a swashplate compressor, a pivoting plate compressor or a pivoting ring compressor, especially for air-conditioning installations in motor vehicles.

13 Claims, 2 Drawing Sheets

DETERMINATION OF THE PISTON STROKE IN A RECIPROCATING PISTON MACHINE

BACKGROUND

The present invention relates to a method for determining the piston stroke of a reciprocating piston engine having a variable stroke, for example a swashplate compressor, a pivoting plate compressor or a pivoting ring compressor, especially for air conditioning systems in motor vehicles. Such compressors are known, and it is known that the stroke of such a compressor can be determined, for example, by measuring the position of the swashplate inside the compressor. This means that these sensors in the driving space must withstand very high temperatures, pressures and the surrounding medium. Another possibility is to use electromagnetic sensors mounted on the outside of the housing to measure the stroke. However, the operation of these sensors may be impaired by a housing made of ferrous materials.

SUMMARY OF THE INVENTION

An object of the present invention is to provide an improved method for determining the piston stroke of a reciprocating piston engine having a variable stroke. The present invention provides a method for determining the piston stroke of a reciprocating piston engine having a variable stroke, for example, a swashplate compressor, a pivoting plate compressor or a pivoting ring compressor, especially for air conditioning systems in motor vehicles, that is distinguished by the fact that the piston stroke of the reciprocating piston engine having a variable stroke is determined indirectly from a so-called effective pressure PD or a rate V of the volume flow and from the differential pressure DP=P high pressure−P suction pressure in the air conditioning circuit and the speed N of the compressor.

One method is preferred in which the effective pressure PD is determined from the volume flow of the compressor as a differential pressure using a resistance apparatus. In addition, a method in which the rate of the compressor volume flow is determined by using a hot-wire anemometer is preferred.

One method according to the present invention is distinguished in that the resistance apparatus can be constituted as a venturi tube. In addition, a resistance apparatus can be implemented using a metering orifice that, possibly, can be integrated in the compressor like the venturi tube. In addition, one resistance apparatus is preferred that is constituted as a measuring nozzle and may be integrated in the compressor housing if necessary.

In addition, a method is preferred in which the high pressure PH and/or the suction pressure PS can be measured using one pressure sensor each or with a differential pressure sensor upstream and downstream of the resistance apparatus. Furthermore, one method is preferred in which the high pressure PH and/or the suction pressure PS can be determined from the evaporator temperature or the ambient temperature of the passenger compartment.

One method according to the present invention is distinguished in that the power consumption of the air conditioning compressor can be determined via the piston stroke. Furthermore, one method is preferred in which the piston stroke of the compressor can be used as the controlled variable for a compressor control valve. In addition, a method is preferred in which the air conditioning compressor may be operated at a specified power by the engine management system of the internal combustion engine via the piston stroke measurement.

BRIEF DESCRIPTION OF THE DRAWINGS

The present invention will now be described using the figures.

DETAILED DESCRIPTION

Figure 1:
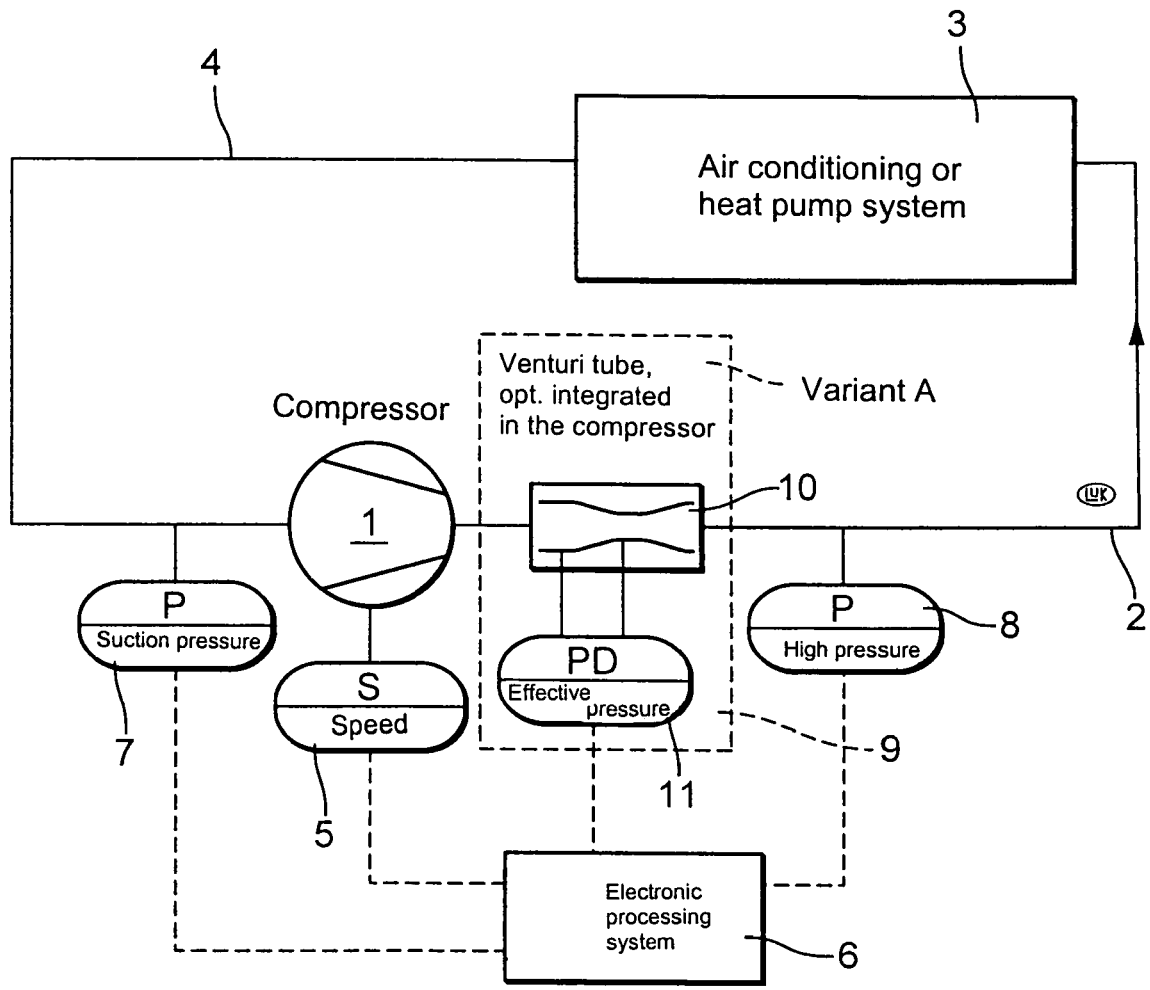
FIG. 1 shows the entire circuit of an air conditioning system.

FIG. 1 shows the circuit of an air conditioning system or heat pump system to be used to describe the determination of the compressor stroke according to the present invention. The circuit contains a compressor 1 having a variable stroke, this compressor being shown here as a symbol. The compressor 1 supplies a coolant under high pressure by way of a line system 2 to the air conditioning system 3 or to a heat pump system 3. From this system, a suction pressure line 4 is routed back to the intake side of the compressor 1. The speed of the compressor is determined using a speed sensor 5 and fed back to an electronic processing system 6. The suction pressure of the compressor is determined using a suction pressure sensor 7 in the suction line area 4. The high pressure is determined using a high-pressure sensor 8 in the high-pressure line area 2 of the system.

The effective pressure itself is determined using a system 9 shown in different versions in the figures. The effective pressure 11, which corresponds to a quantity that characterizes the volume flow of the compressor, is determined by means of a venturi tube 10 in FIG. 1. Therefore, the piston stroke determination of the compressor operates such that the volume flow pumped by the coolant compressor is determined using this effective pressure measurement. The pumped volume flow is proportional to the piston stroke of the compressor. If the volumetric efficiency of the compressor is also known as a function of the pressure ratio P high pressure-P suction pressure, the piston stroke of the compressor can be calculated from the volume flow, the speed 5 and the ratios of the pressures 8-7. The pressure ratio is measured in this case using the high-pressure sensor 8 or the suction-pressure sensor 7. If no information about the suction pressure 7 or the high pressure 8 is available, these pressures can also be determined indirectly using the temperature of the evaporator in the circulation system or from the ambient temperature of the passenger compartment.

Information about the power consumption of the compressor that can be used for the engine management system can be obtained from the compressor piston stroke data. It is also possible to operate the compressor at a power specified by the engine management system in that the piston stroke is used as the controlled variable for the compressor control valve. In this manner, the present invention provides the potential of providing precise information about the compressor power consumption and to satisfy the demand that a compressor be operated at a specified power consumption, for example, if the internal combustion engine can or should make only a specific torque available to the compressor. Consequently, the present invention makes it possible to operate a compressor at a specified power consumption or to directly control the compressor piston stroke.

Figure 2:
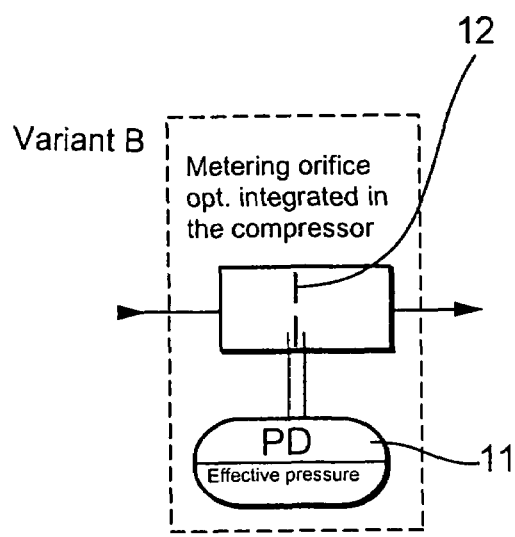
FIG. 2, FIG. 3 and FIG. 4 each show variations of the method for determining the effective pressure.

FIG. 2 shows an additional version for determining the effective pressure 11. In this case, the effective pressure PD is determined using a metering orifice in that the compressor volume flow in the high-pressure area is routed through the metering orifice 12 and in so doing the differential pressure is determined upstream and downstream of the metering orifice, this differential pressure representing the effective pressure PD. In this case, this metering orifice can be configured both outside the compressor in the air conditioning circuit and inside the compressor in the housing or in the cylinder head.

Figure 3:
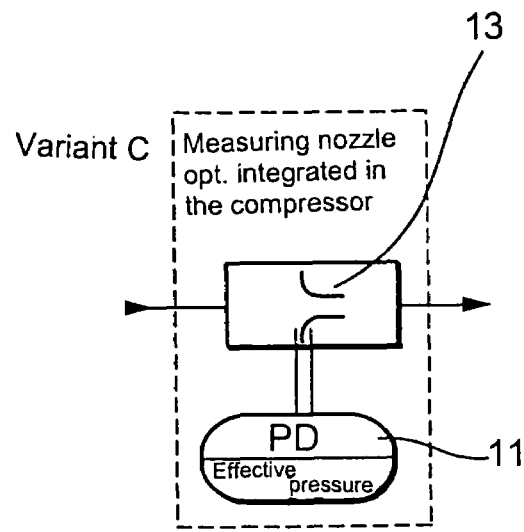

FIG. 3 depicts an additional variant for determining the effective pressure 11 with a measuring nozzle 13 being used as a flow resistance for the compressor volume flow.

Figure 4:
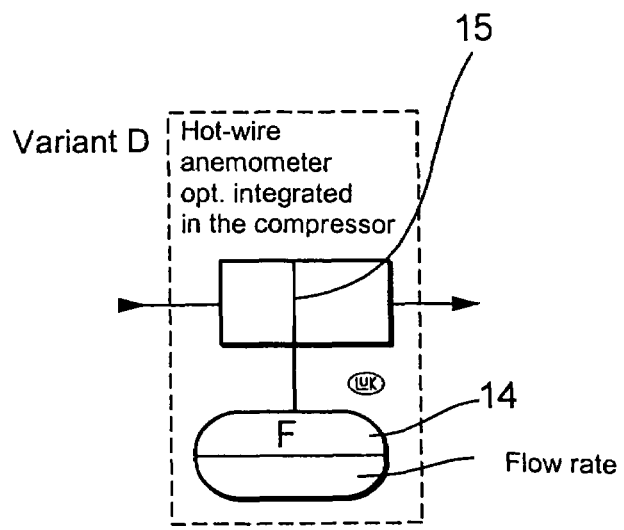

FIG. 4 illustrates one possible physical implementation for determining the volume flow rate on the high-pressure side of the compressor using a hot-wire anemometer 15. The measured quantity supplied by this hot-wire anemometer is the flow rate 14 of the volume flow supplied by the compressor. The compressor piston stroke can be determined by way of the rate as well as by way of the effective pressure using the relationships described previously.

References used in the dependent claims refer to the additional construct of the subject matter of the claim by the features of the corresponding dependent claim; they are not to be understood as a waiver of an independent subject-matter protection for the combinations of features of the referenced dependent claim.

As the subject matter of the dependent claims may form individual and independent inventions with regard to the state of the art on the priority date, the applicant reserves the right to make them the subject matter of independent claims or declarations of severance. They may also contain independent inventions that exhibit a form independent of the subject matter of the preceding dependent claims.

What is claimed is:

1. A method for determining a piston stroke of a reciprocating piston engine, the reciprocating piston engine being a compressor and having a variable stroke, the method comprising the step of:
    determining the piston stroke indirectly as a function of an effective pressure or a rate of a volume flow of the compressor, of a differential pressure, the differential pressure being a high pressure minus a suction pressure, and of a speed of the compressor.

2. The method as recited in claim 1 wherein the rate of the volume flow is determined using a hot-wire anemometer.

3. The method as recited in claim 1 wherein the high pressure and/or the suction pressure are measured with one pressure sensor each or with a differential pressure sensor upstream and downstream of a resistance apparatus.

4. The method as recited in claim 1 wherein the high pressure and/or the suction pressure are determined as a function of an evaporator temperature or an ambient temperature of a passenger compartment.

5. The method as recited in claim 1 further comprising determining a power consumption of the compressor as a function of the piston stroke of the compressor.

6. The method as recited in claim 1 further comprising using the piston stroke of the compressor as a control variable for a compressor control valve.

7. The method as recited in claim 1 wherein the compressor is an air conditioning compressor operated by an engine management system at a specified power using the piston stroke determination.

8. The method as recited in claim 1 wherein the compressor is a swashplate compressor, a pivoting plate compressor, or a pivoting ring compressor.

9. The method as recited in claim 1 wherein the compressor is an air conditioning compressor in a motor vehicle.

10. The method as recited in claim 1 wherein the effective pressure is determined from the volume flow as a pressure difference through a resistance apparatus.

11. The method as recited in claim 10 wherein the resistance apparatus is a venturi tube.

12. The method as recited in claim 10 wherein the resistance apparatus is an orifice.

13. The method as recited in claim 10 wherein the resistance apparatus is a nozzle.

\* \* \* \* \*

UNITED STATES PATENT AND TRADEMARK OFFICE
CERTIFICATE OF CORRECTION

PATENT NO. : 7,263,877 B2 Page 1 of 1
APPLICATION NO. : 10/495824
DATED : September 4, 2007
INVENTOR(S) : Tilo Schaefer and Georg Weber It is certified that error appears in the above-identified patent and that said Letters Patent is hereby corrected as shown below:

In column 3, the last two paragraphs of the specification, lines 20 through 32 should be deleted.

Signed and Sealed this

Twenty-fifth Day of December, 2007

JON W. DUDAS
*Director of the United States Patent and Trademark Office*